United States Patent
Cheng

(10) Patent No.: US 10,138,061 B2
(45) Date of Patent: Nov. 27, 2018

(54) AUTO-SORTING STORAGE/RETRIEVAL SYSTEM

(71) Applicant: TCTM (HONG KONG) LIMITED, Taoyuan (TW)

(72) Inventor: Hwang-cheng Cheng, Taoyuan (TW)

(73) Assignee: TCTM (HONG KONG) LIMITED, Taoyuan (TW)

( * ) Notice: Subject to any disclaimer, the term of this patent is extended or adjusted under 35 U.S.C. 154(b) by 0 days.

(21) Appl. No.: 15/688,835

(22) Filed: Aug. 28, 2017

(65) Prior Publication Data

US 2018/0111758 A1 Apr. 26, 2018

(30) Foreign Application Priority Data

Oct. 24, 2016 (TW) .............................. 105134343 A

(51) Int. Cl.
*B65G 1/137* (2006.01)
*B65G 1/04* (2006.01)
*B65G 1/127* (2006.01)
*B23Q 3/155* (2006.01)
*B65G 1/10* (2006.01)
*B07C 3/02* (2006.01)
*B07C 3/00* (2006.01)

(52) U.S. Cl.
CPC ......... *B65G 1/137* (2013.01); *B23Q 3/15539* (2016.11); *B23Q 3/15546* (2013.01); *B65G 1/0442* (2013.01); *B65G 1/10* (2013.01); *B65G 1/127* (2013.01); *B07C 3/008* (2013.01); *B07C 3/02* (2013.01); *B23Q 2003/15537* (2016.11)

(58) Field of Classification Search
CPC .......... B07C 3/008; B07C 3/02; B65G 1/026; B65G 1/0442; B65G 1/10; B65G 1/127; B65G 1/137; B65G 2814/0313; B23Q 3/15539; B23Q 3/15546
USPC .................... 209/630; 198/347.1, 349, 358
See application file for complete search history.

(56) References Cited

U.S. PATENT DOCUMENTS

| | | | | |
|---|---|---|---|---|
| 2,490,694 A * | 12/1949 | Leutheuser | ............. | F25D 25/00 312/308 |
| 3,027,023 A * | 3/1962 | Mcgrath | ................ | B65G 37/00 414/276 |
| 5,379,229 A * | 1/1995 | Parsons | ................ | B65G 1/1378 414/273 |
| 6,325,586 B1 * | 12/2001 | Loy | .......................... | B65G 1/02 414/281 |
| 6,450,751 B1 * | 9/2002 | Hollander | ............. | B65G 1/1378 198/347.4 |
| 6,554,561 B2 * | 4/2003 | Jager | ..................... | B23P 19/001 414/788.4 |
| 6,694,767 B2 * | 2/2004 | Junca | .................... | F25D 23/026 62/266 |

(Continued)

*Primary Examiner* — Joseph C Rodriguez

(57) ABSTRACT

An auto-sorting storage/retrieval system includes an identification mechanism, a first pick and place device, a second pick and place device, and a feed and storage equipment including a feed unit and a storage unit respectively disposed at two opposite sides relative to the identification mechanism and respectively movable up and down for enabling the identification mechanism to recognize and sort drill bits. As the auto-sorting storage/retrieval system can run independently without any additional arrangement, it can be freely installed anywhere without particular space limitation.

3 Claims, 14 Drawing Sheets

(56) References Cited

U.S. PATENT DOCUMENTS

| | | | | |
|---|---|---|---|---|
| 6,729,836 B2* | 5/2004 | Stingel, III | ............... | B65G 1/08 |
| | | | | 198/347.1 |
| 7,249,688 B2* | 7/2007 | Hunter | ................. | B65G 1/0435 |
| | | | | 221/119 |
| 7,887,279 B2* | 2/2011 | Izumi | ................... | B65G 1/0407 |
| | | | | 414/281 |
| 7,918,641 B2* | 4/2011 | Sugiyama | ............... | G11B 5/455 |
| | | | | 414/331.16 |
| 8,925,709 B2* | 1/2015 | Studer | .................... | B65G 1/023 |
| | | | | 198/347.1 |
| 9,850,066 B2* | 12/2017 | Salichs | ................. | B65G 1/026 |
| 9,908,701 B2* | 3/2018 | Blumenau | ............. | B65G 1/137 |
| 10,023,385 B2* | 7/2018 | Shibata | ............. | H01L 21/67769 |

* cited by examiner

AUTO-SORTING STORAGE/RETRIEVAL SYSTEM

BACKGROUND OF THE INVENTION

1. Field of the Invention

The present invention relates to warehousing technology and more particularly, to an auto-sorting storage/retrieval system so configured that a feed unit and a storage unit at two opposite lateral sides of an identification mechanism are respectively movable up and down so that the identification mechanism can recognize and sort drill bits efficiently, improving space utilization.

2. Description of the Related Art

Regular drill bits for processing workpieces are too small to be identified by naked eyes for further sorting. After use, different sizes of drill bits are placed in one same box. When sorting the sizes of drill bits, drill bits are manually put in an identification mechanism for size identification and further sorting and storage. This drill bit identification and sorting manner requires much labor and cannot avoid drill bit misallocation. There are manufacturers teach the use of pickup devices to pick up drill bits for size-identification and further sorting in an automatic manner. However, because the storage boxes for holding drill bits are delivered by a belt conveyor system, the invention of the system needs a large installation space. After installation, the system arrangement cannot be freely changed to fit different application requirements.

SUMMARY OF THE INVENTION

The present invention has been accomplished under the circumstances in view. It is therefore the main object of the present invention to provide an auto-sorting storage/retrieval system which is so designed that the feed unit and the storage unit at the two opposite lateral sides of the identification mechanism of the auto-sorting storage/retrieval system are respectively movable up and down so that the identification mechanism can recognize and sort drill bits efficiently, improving space utilization. Since the auto-sorting storage/retrieval system can run independently without any additional arrangement, it can be freely installed anywhere without particular space limitation.

To achieve this and other objects of the present invention, an auto-sorting storage/retrieval system comprises a housing, an identification mechanism, a first pick and place device, a second pick and place device, and a feed and storage equipment. The identification mechanism is mounted on the surface of the housing for recognizing and sorting drill bits. The first pick and place device is mounted in the housing and disposed at one side relative to the identification mechanism. The second pick and place device is mounted in the housing and disposed at an opposite side relative to the identification mechanism. The feed and storage equipment is mounted in the housing, comprising a feed unit disposed near one side of the first pick and place device and a storage unit disposed near one side of the second pick and place device opposite to the feed unit. The feed unit comprises a feed three-dimensional rack, and a feed lifter for moving the feed three-dimensional rack vertically up and down. The feed three-dimensional rack has mounted therein a plurality of feed trays that are arranged in Z-axis direction for carrying drill bits for identification by the identification mechanism. The storage unit comprises a storage three-dimensional rack, and a storage lifter for moving the storage three-dimensional rack vertically up and down. The storage three-dimensional rack has mounted therein a plurality of storage trays that are arranged in Z-axis direction for holding drill bits that are size-identified by the identification mechanism. The feed unit further comprises a feed shell body, and two feed sliding rails bilaterally mounted in the feed shell body in Z-axis direction. The feed three-dimensional rack is coupled between the two feed sliding rails. The feed lifter comprises a feed actuator, a feed transmission device and a feed guide rod. The feed transmission device has one end thereof connected to the feed actuator, and an opposite end thereof connected to one end of the feed guide rod. The feed guide rod has an opposite end thereof disposed remote from the feed transmission device and connected to the feed three-dimensional rack so that when the feed actuator is activated, the feed transmission device drives the feed guide rod to rotate, causing movement of the feed three-dimensional rack in the feed shell body along the feed sliding rails. The storage unit further comprises a storage shell body, and two storage sliding rails bilaterally mounted in the storage shell body in Z-axis direction. The storage three-dimensional rack is coupled between the two storage sliding rails. The storage lifter comprises a storage actuator, a storage transmission device and a storage guide rod. The storage transmission device has one end thereof connected to the storage actuator, and an opposite end thereof connected to one end of the storage guide rod. The storage guide rod has an opposite end thereof disposed remote from the storage transmission device and connected to the storage three-dimensional rack so that when the storage actuator is activated, the storage transmission device drives the storage guide rod to rotate, causing movement of the storage three-dimensional rack in the storage shell body along the storage sliding rails.

DETAILED DESCRIPTION OF THE PREFERRED EMBODIMENT

Figure 1:
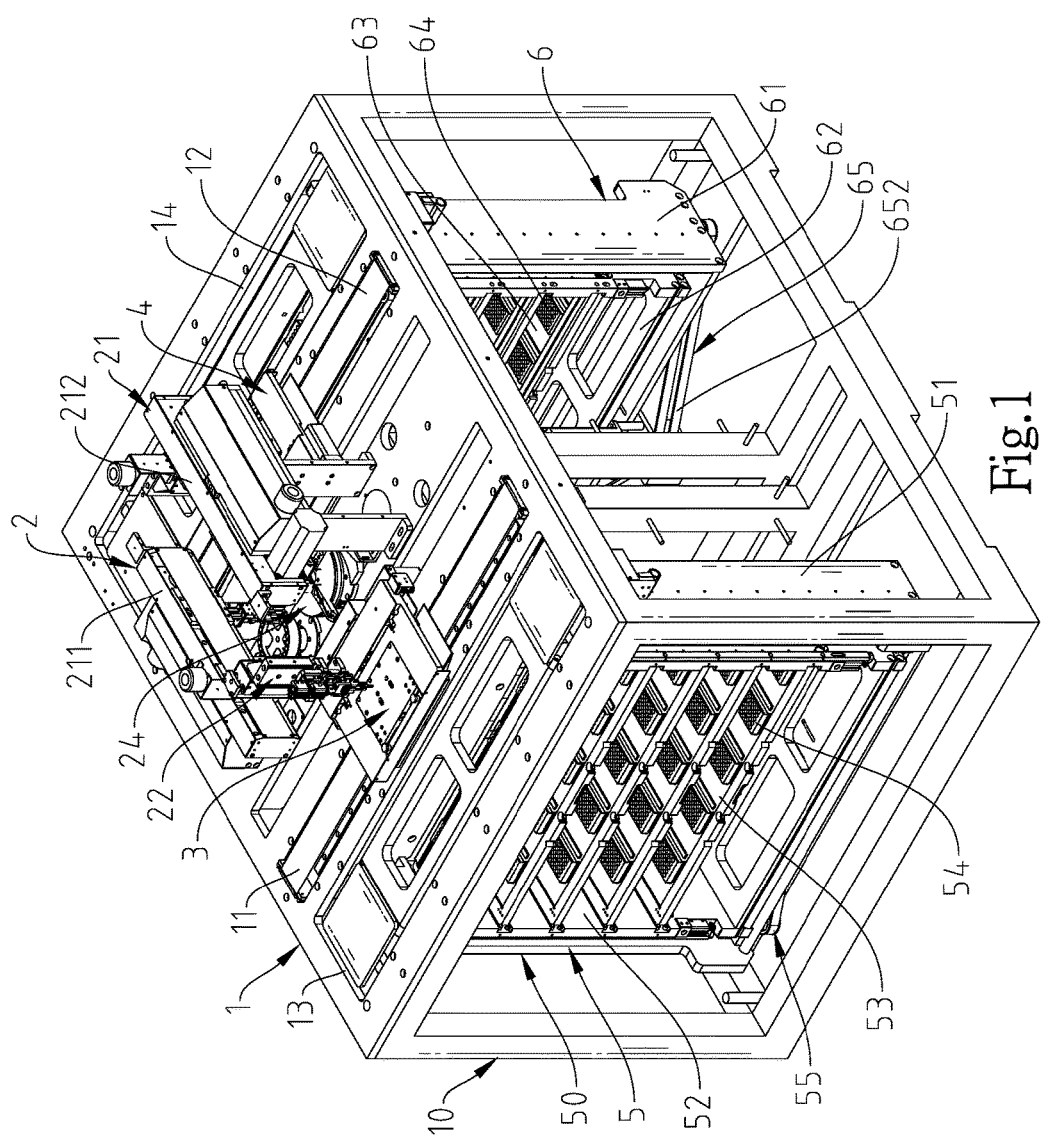
FIG. 1 is an oblique top elevational view of an auto-sorting storage/retrieval system in accordance with the present invention.
Figure 2:
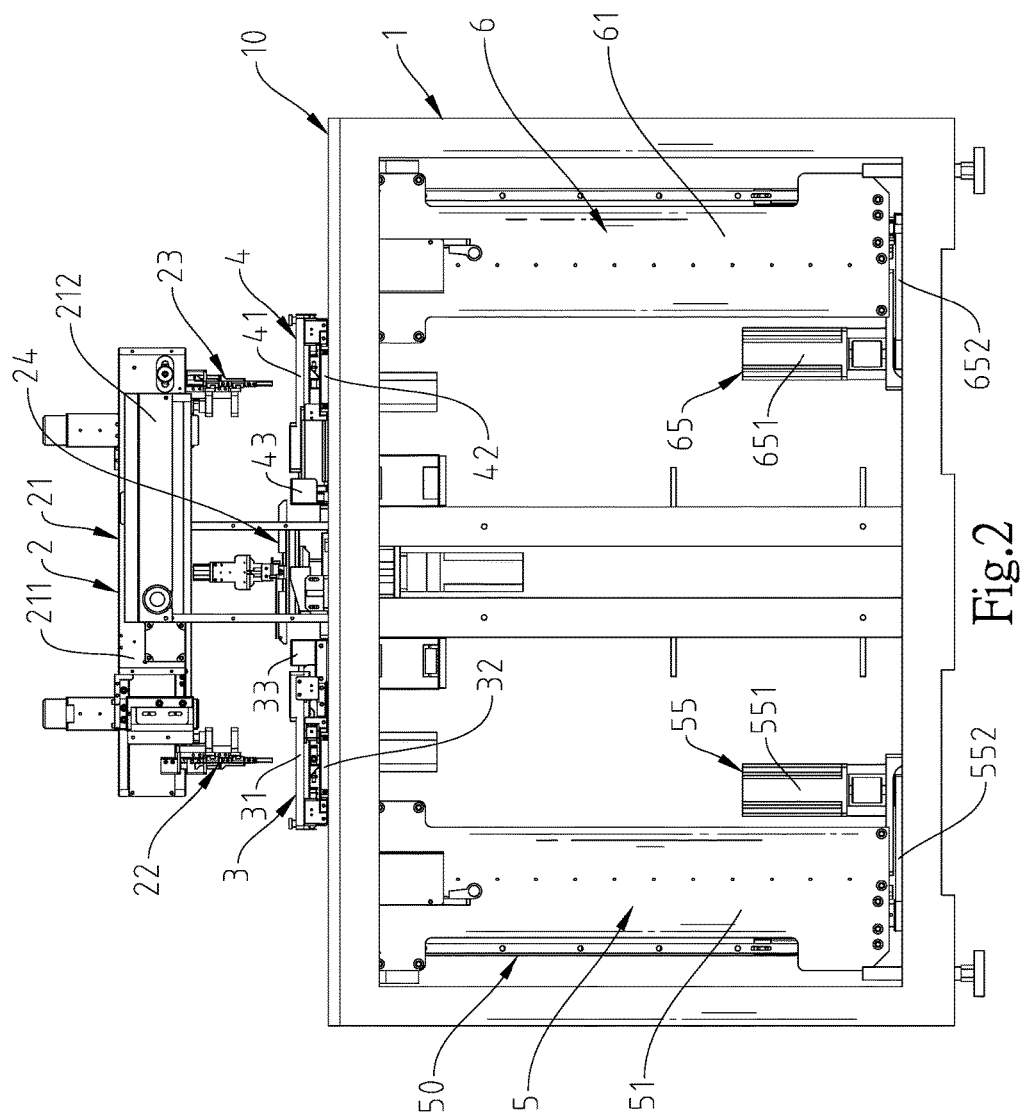
FIG. 2 is a side view of the auto-sorting storage/retrieval system in accordance with the present invention.
Figure 3:
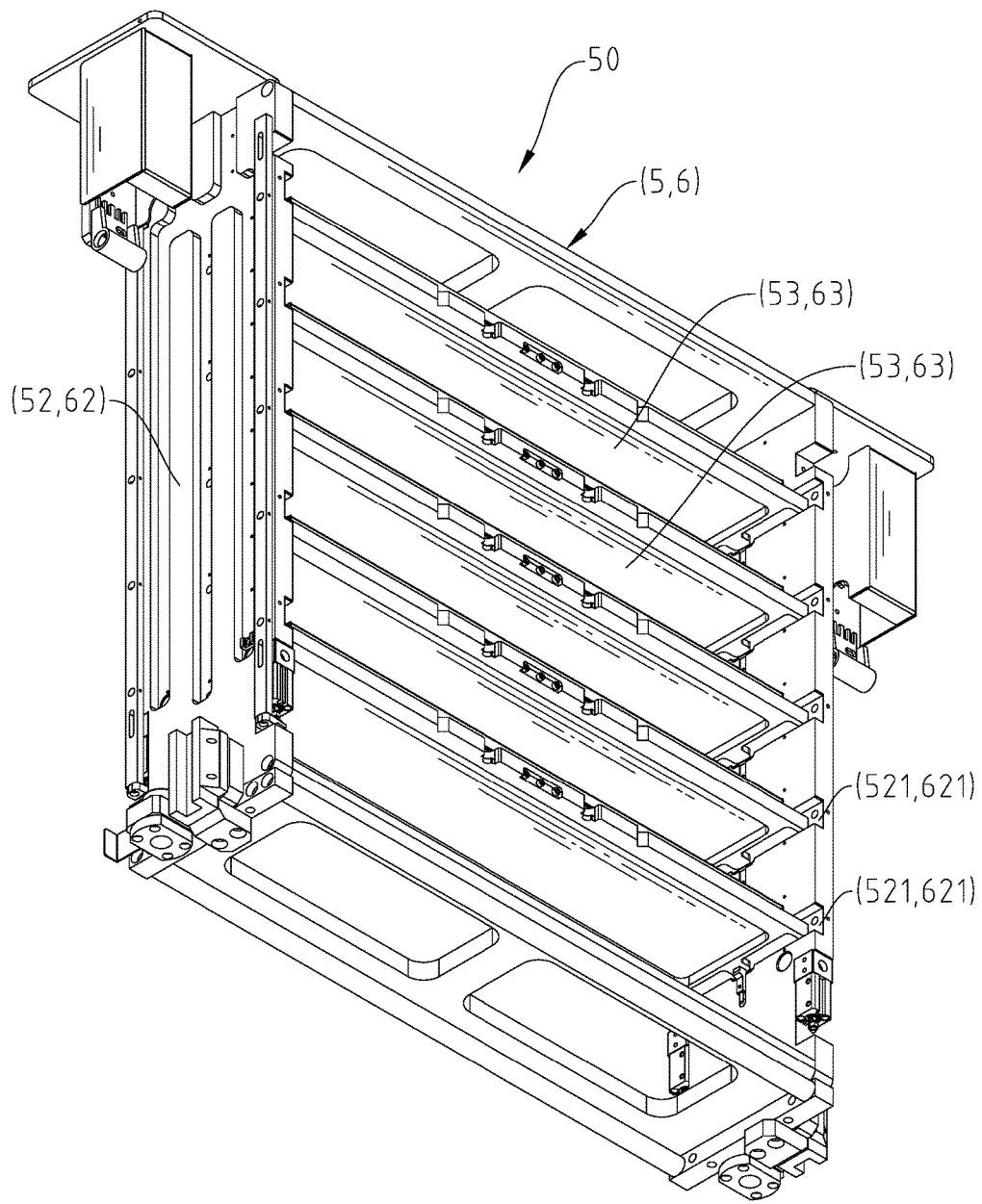
FIG. 3 is a bottom view of the feed three-dimensional rack and storage three-dimensional rack of the auto-sorting storage/retrieval system in accordance with the present invention.
Figure 4:
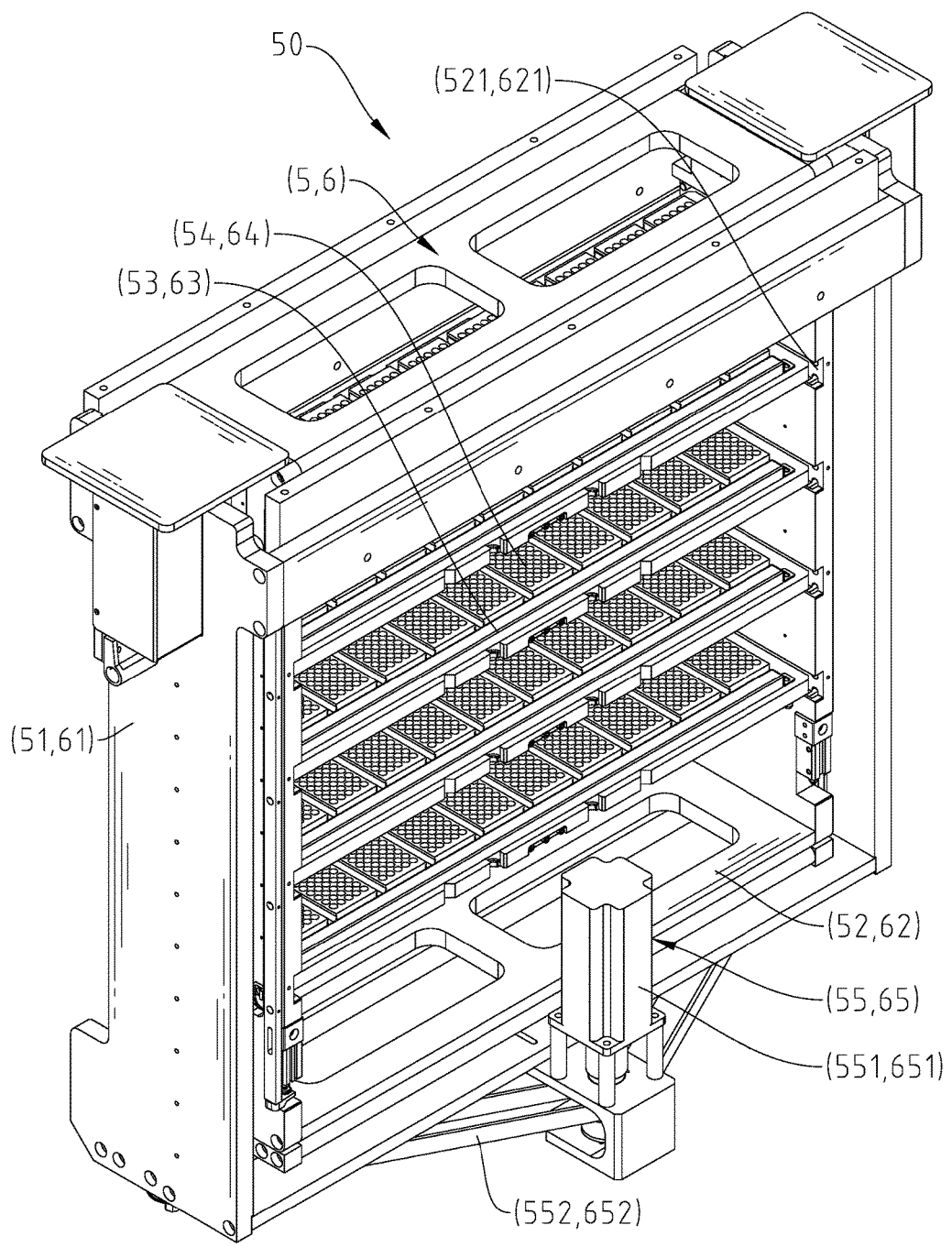
FIG. 4 is an oblique top elevational view of the feed unit/storage unit of the auto-sorting storage/retrieval system in accordance with the present invention.
Figure 5:
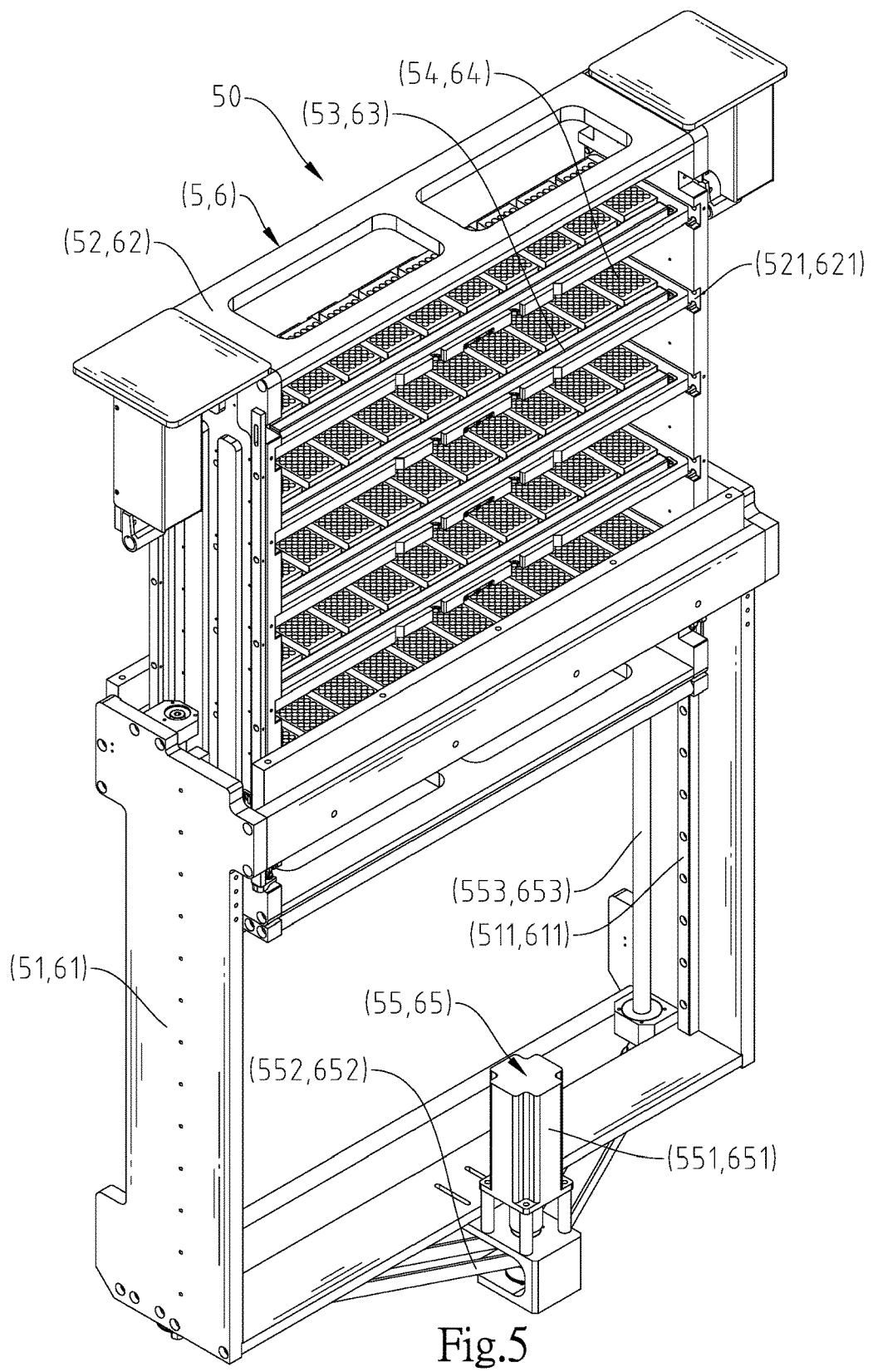
FIG. 5 illustrates the feed three-dimensional rack of the feed unit/the storage three-dimensional rack of the storage unit lifted.
Figure 6:
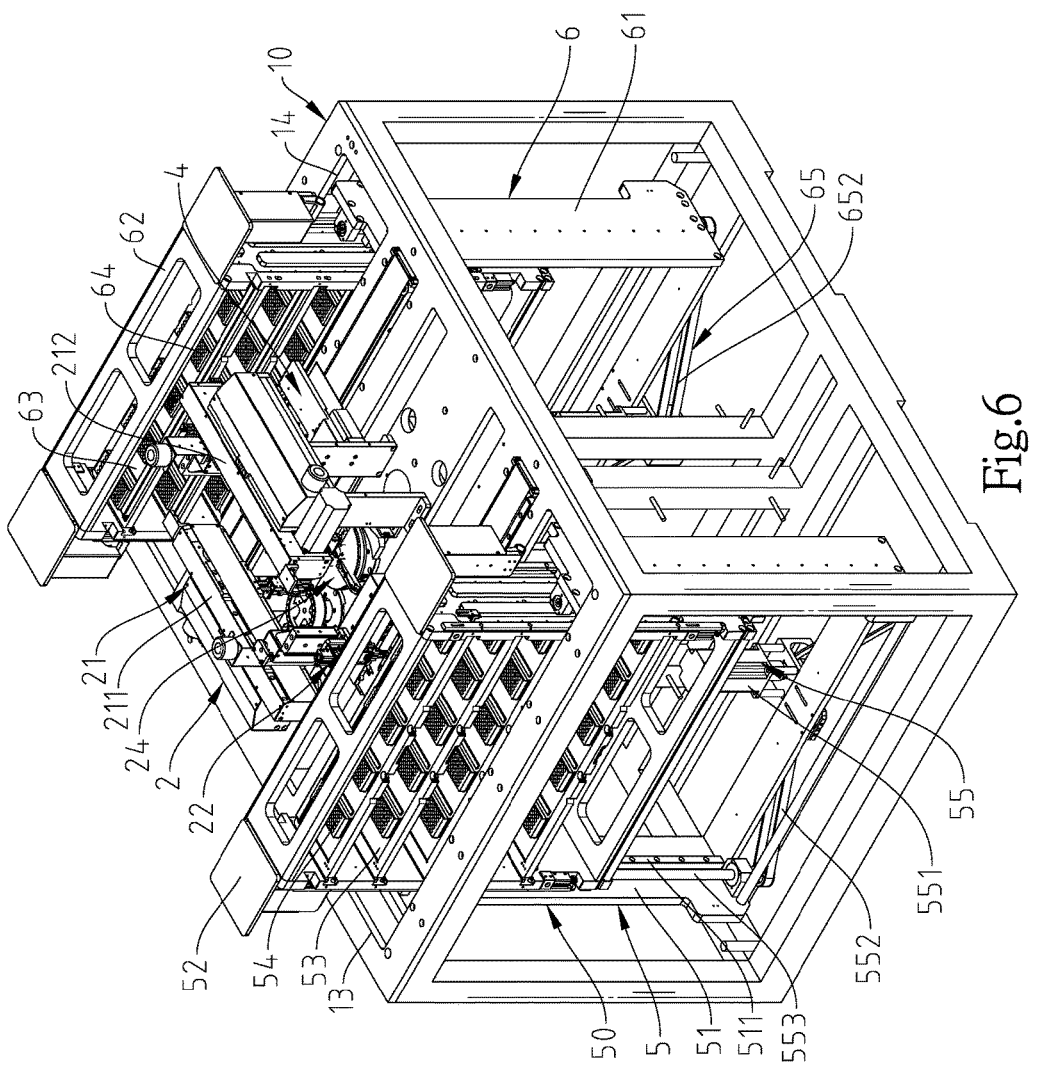
FIG. 6 is an oblique top elevational view illustrating the feed three-dimensional rack and the storage three-dimensional rack lifted.
Figure 7:
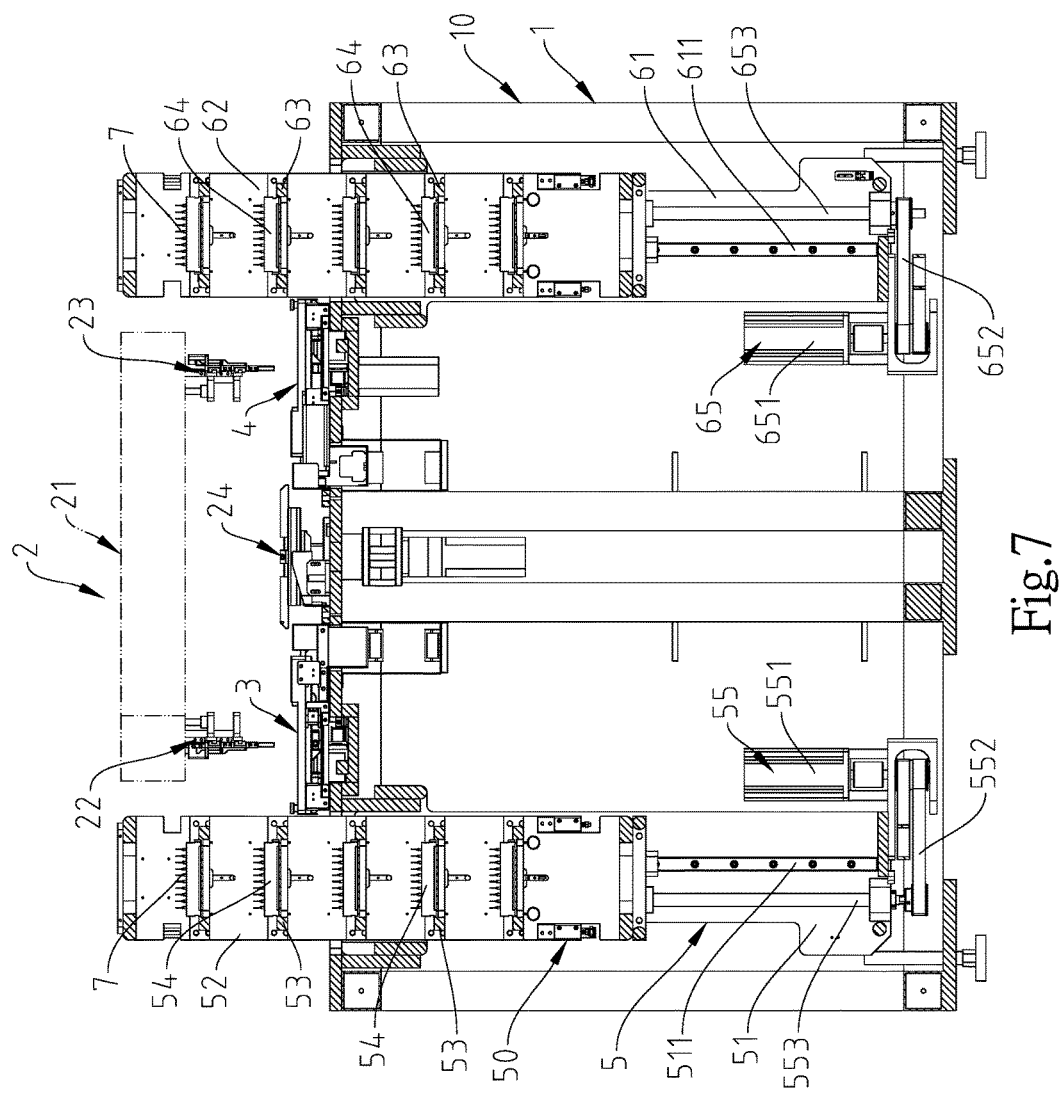
FIG. 7 is a side view illustrating the feed three-dimensional rack and the storage three-dimensional rack lifted.

Referring to FIGS. 1 and 2, an auto-sorting storage/retrieval system in accordance with the present invention is shown. The auto-sorting storage/retrieval system 10 comprises a housing 1, an identification mechanism 2 mounted at one side of the housing 1, a first pick and place device 3 mounted in the housing 1 at one side relative to the identification mechanism 2, a second pick and place device 4 mounted in the housing 1 at an opposite side relative to the identification mechanism 2, and a feed and storage equipment 50 that comprises a feed unit 5 mounted in the housing 1 at one lateral side and disposed adjacent to the first pick and place device 3 and a storage unit 6 mounted in the housing 1 at an opposite lateral side and disposed adjacent to the second pick and place device 4.

The housing 1 comprises a first sliding rail 11 and a second sliding rail 12 extending in the X-axis direction, a first through hole 13, and a second through hole 14. The first sliding rail 11 is arranged between the outer surface of the housing 1 and the first pick and place device 3. The second sliding rail 12 is arranged between the outer surface of the housing 1 and the second pick and place device 4. The first through hole 13 and the second through hole 14 are respectively disposed adjacent to the first sliding rail 11 and the second sliding rail 12.

The identification mechanism 2 comprises a base block set 21, a first clamp assembly 22, a second clamp assembly 23 and an identification device 24. The base block set 21 comprises a first base block 211 and a second base block 212 arranged in parallel, and a third actuator mounted at the first base block 211 and the second base block 212. The first clamp assembly 22 is disposed above the first pick and place device 3 to face toward the first base block 211, and drivable by the third actuator to move on the first base block 211 in the Y-axis direction. The second clamp assembly 23 is disposed above the second pick and place device 4 to face toward the second base block 212, and drivable by the third actuator to move on the second base block 212 in the Y-axis direction. The identification device 24 is disposed between the first base block 211 and second base block 212 of the base block set 21 and also between the first clamp assembly 22 and the second clamp assembly 23. In the present preferred embodiment, the identification device 24 is an image sensor.

The first pick and place device 3 comprises a first carrier 31, a first sliding seat 32 and a first actuator 33. The first carrier 31 is disposed above the first sliding seat 32. The first sliding seat 32 is slidably mounted on the first sliding rail 11 of the housing 1 for moving the first carrier 31 along the first sliding rail 11 in the X-axis direction. The first actuator 33 is connected with one side of the first carrier 31, and adapted for moving the first carrier 31 relative to the first sliding seat 32 in the Y-axis direction.

The second pick and place device 4 comprises a second carrier 41, a second sliding seat 42 and a second actuator 43. The second carrier 41 is disposed above the second sliding seat 42. The second sliding seat 42 is slidably mounted on the second sliding rail 12 of the housing 1 for moving the second carrier 41 along the second sliding rail 12 in the X-axis direction. The second actuator 43 is connected with one side of the second carrier 41, and adapted for moving the second carrier 41 relative to the second sliding seat 42 in the Y-axis direction.

Referring to FIGS. 1, 3, 4 and 7, the feed unit 5 comprises a feed shell body 51, a feed three-dimensional rack 52, a plurality of feed trays 53 and a feed lifter 55. The feed shell body 51 is mounted inside the housing 1 below the first through hole 13, comprising two feed sliding rails 511 arranged in parallel at two opposite sides and extending in the Z-axis direction. The feed three-dimensional rack 52 is mounted in the feed shell body 51 and slidably coupled between the two feed sliding rails 511, comprising two sets of feed tray rails 521 symmetrically disposed at two opposite sides and spaced in the Z-axis direction. The feed trays 53 are respectively supported on the feed tray rails 521, each carrying a plurality feed boxes 54. Each feed box 54 adapted for holding drill bits 7 for identification. The feed lifter 55 comprises a feed actuator 551, a feed transmission device 552 and a feed guide rod 553. The feed transmission device 552 has one end thereof connected to the feed actuator 551, and an opposite end thereof connected to one end of the feed guide rod 553. The feed guide rod 553 has an opposite end thereof disposed remote from the feed transmission device 552 and connected to the feed three-dimensional rack 52. When starting up the feed actuator 551, the feed transmission device 552 is driven to rotate the feed guide rod 553, causing movement of the feed three-dimensional rack 52 in the feed shell body 51 along the feed sliding rail 511. As illustrated, the feed actuator 551 in the present preferred embodiment is a motor; the feed transmission device 552 is a transmission belt coupled between the feed actuator 551 and the feed guide rod 553; the feed guide rod 553 is a screw rod, however, rolling balls can be selectively used to substitute for the screw rod.

The storage unit 6 comprises a storage shell body 61, a storage three-dimensional rack 62, a plurality of storage trays 63 and a storage lifter 65. The storage shell body 61 is mounted in the housing 1 below the second through hole 14, comprising two storage sliding rails 611 arranged in parallel at two opposite sides and extending in the Z-axis direction. The storage three-dimensional rack 62 is mounted in the storage shell body 61 and slidably coupled between the two storage sliding rails 611, comprising two sets of storage tray rails 621 symmetrically disposed at two opposite sides and spaced in the Z-axis direction. The storage trays 63 are respectively supported on the storage tray rails 621, each carrying a plurality of storage boxes 64 adapted for holding size-identified drill bits 7. The storage lifter 65 comprises a storage actuator 651, a storage transmission device 652 and a storage guide rod 653. The storage transmission device 652 has one end thereof connected to the storage actuator 651, and an opposite end thereof connected to one end of the storage guide rod 653. The opposite end of the storage guide rod 653 remote from the storage transmission device 652 is connected to the storage three-dimensional rack 62. When the storage actuator 651 is activated, the storage transmission device 652 drives the storage guide rod 653 to rotate, causing movement of the storage three-dimensional rack 62 vertically in the storage shell body 61 along the storage sliding rail 611. In the present preferred embodiment, the storage actuator 651 is a motor; the storage transmission device 652 is a transmission belt coupled between the feed actuator 551 and the feed guide rod 553; the storage guide rod 653 is a screw rod, however, tolling balls can be selectively used to substitute for the screw rod.

Figure 8:
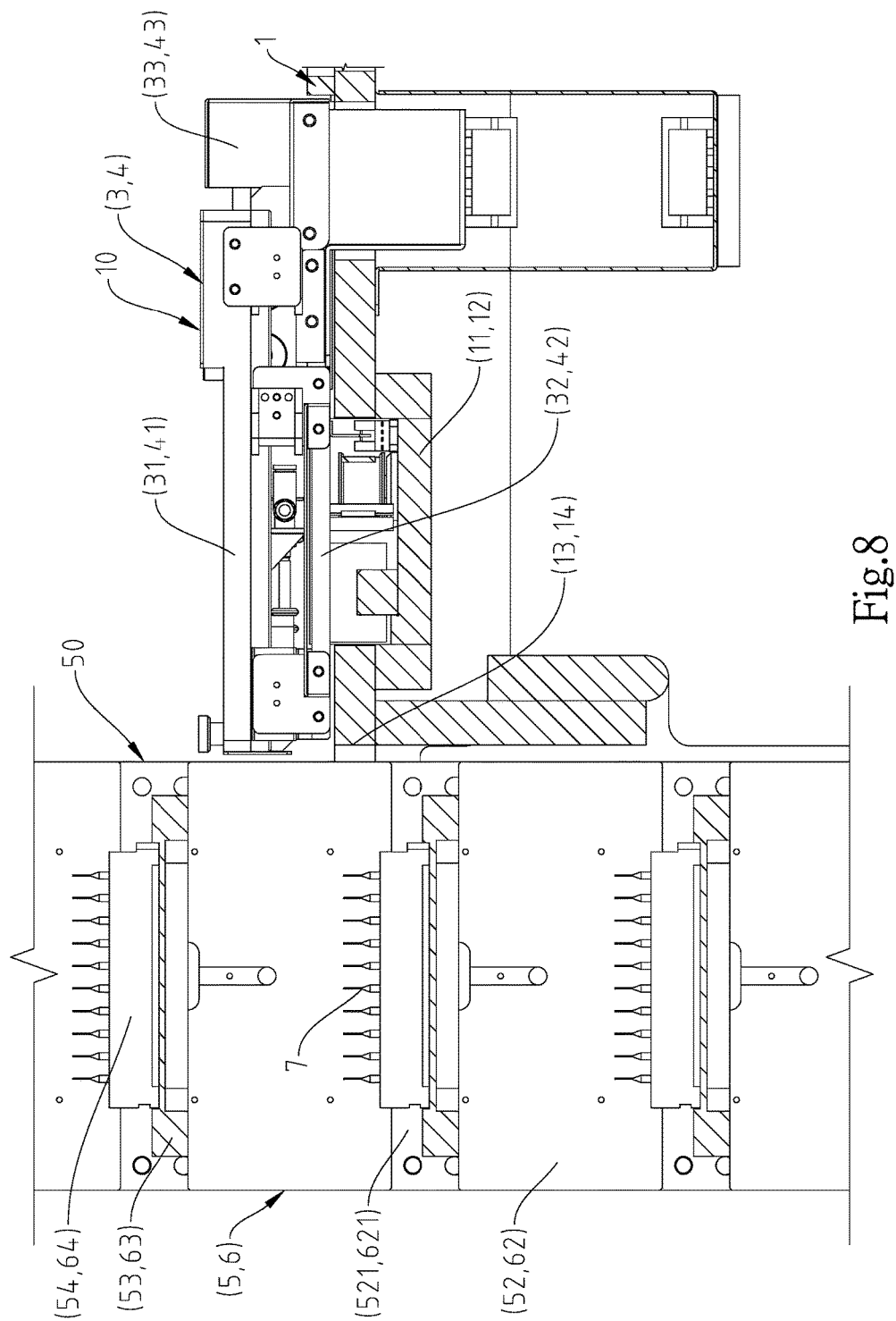
FIG. 8 is a sectional view illustrating the relationship between the first pick and place device and the feed three-dimensional rack in the lifted position and the relationship between the second pick and place device and the storage three-dimensional rack in the lifted position.
Figure 9:
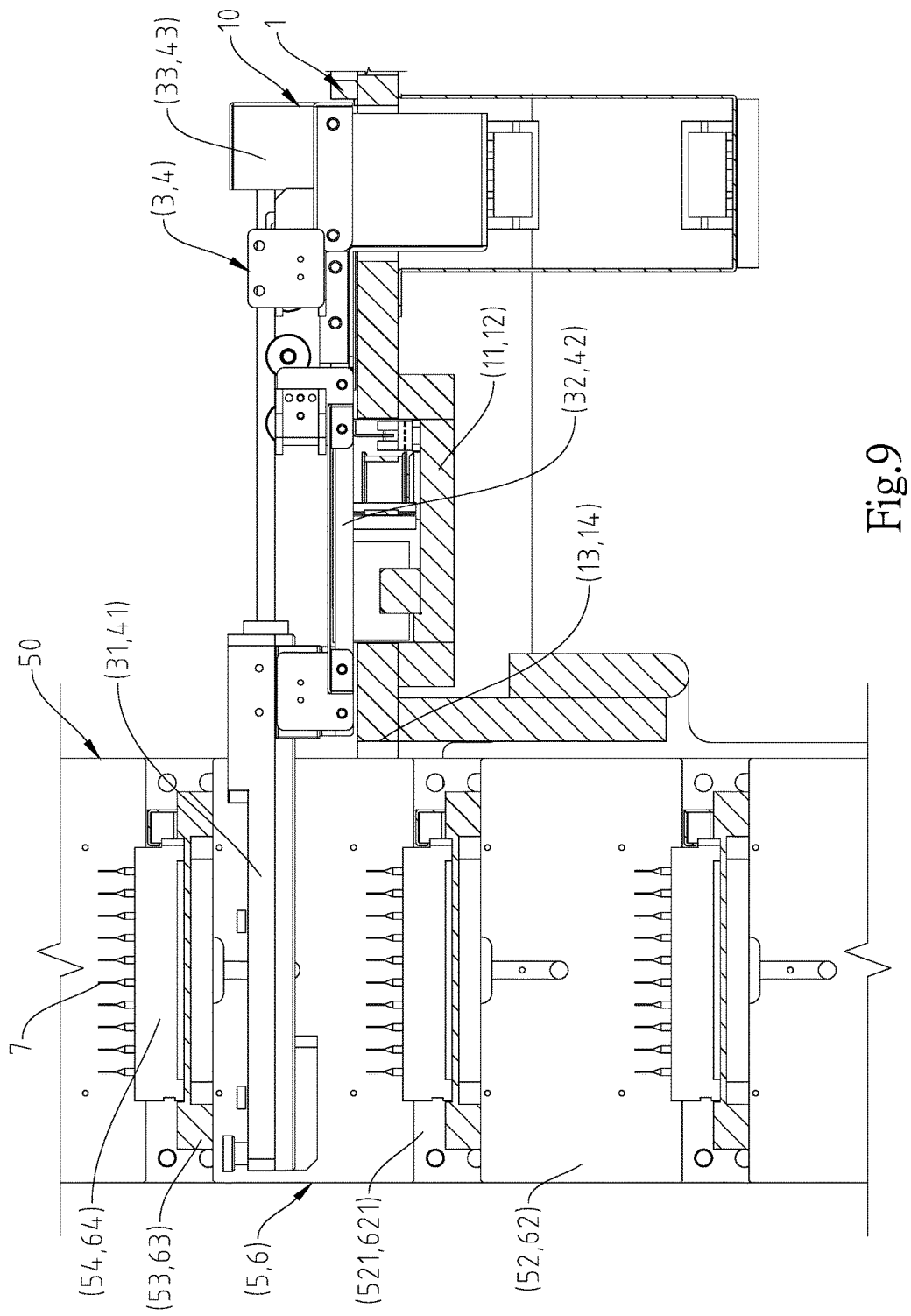
FIG. 9 is a sectional view illustrating the first carrier positioned between two feed trays and the second carrier positioned between two storage trays.
Figure 10:
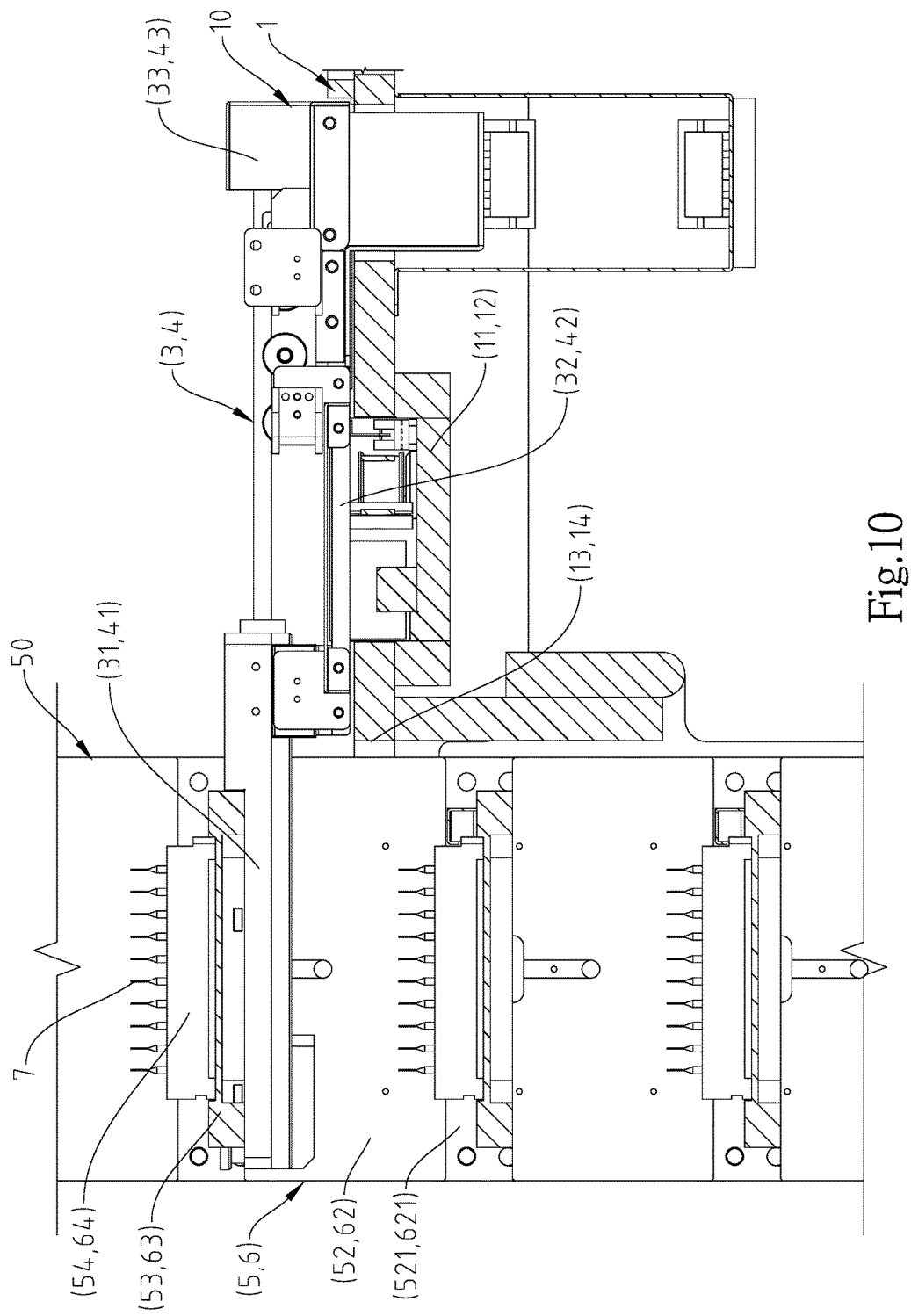
FIG. 10 is a sectional view illustrating one feed tray engaged with the first carrier and one storage tray engaged with the second carrier.
Figure 11:
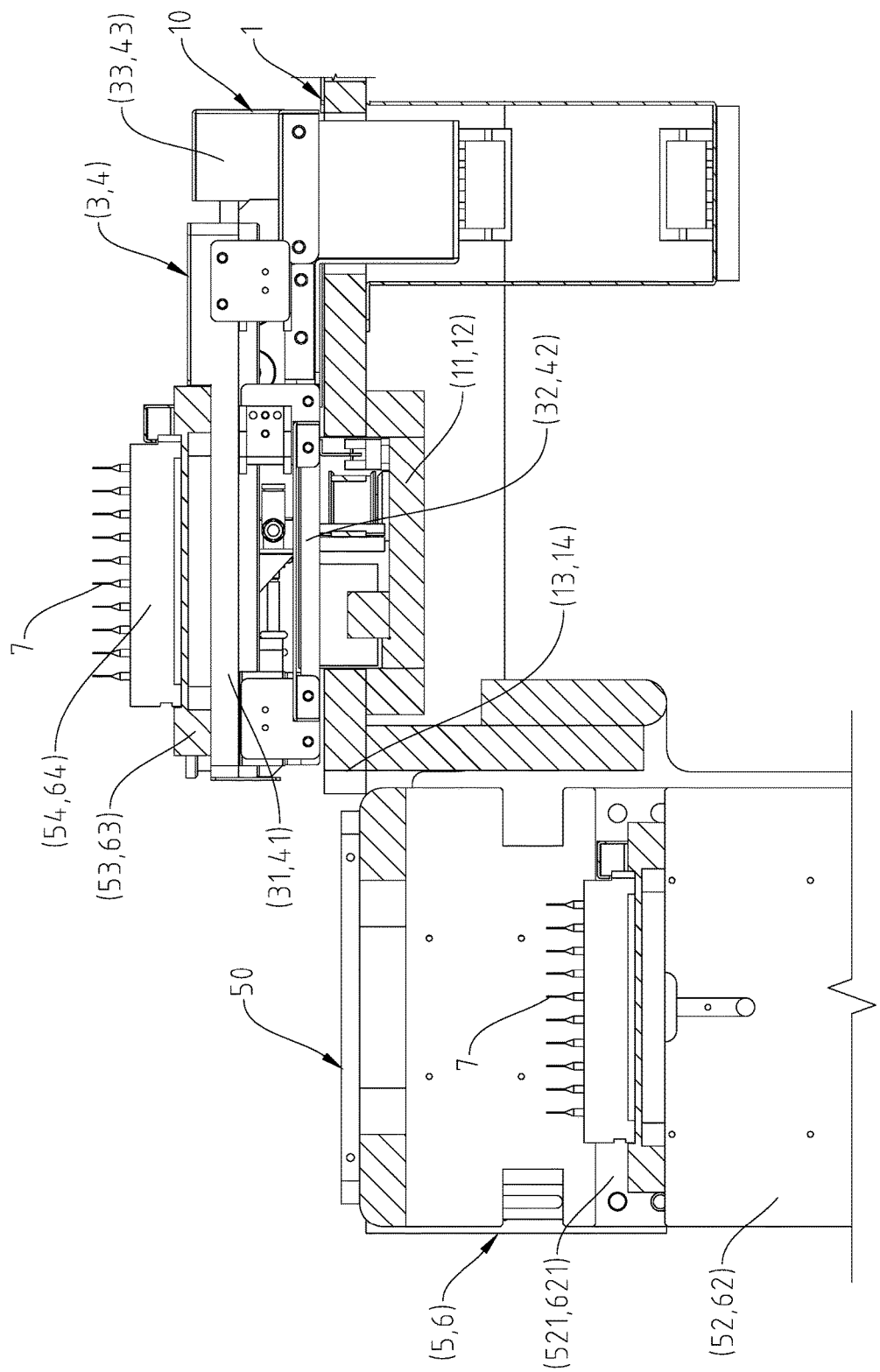
FIG. 11 is a sectional view illustrating the first pick and place device picked up one feed tray and the second pick and place device picked up one storage tray.
Figure 12:
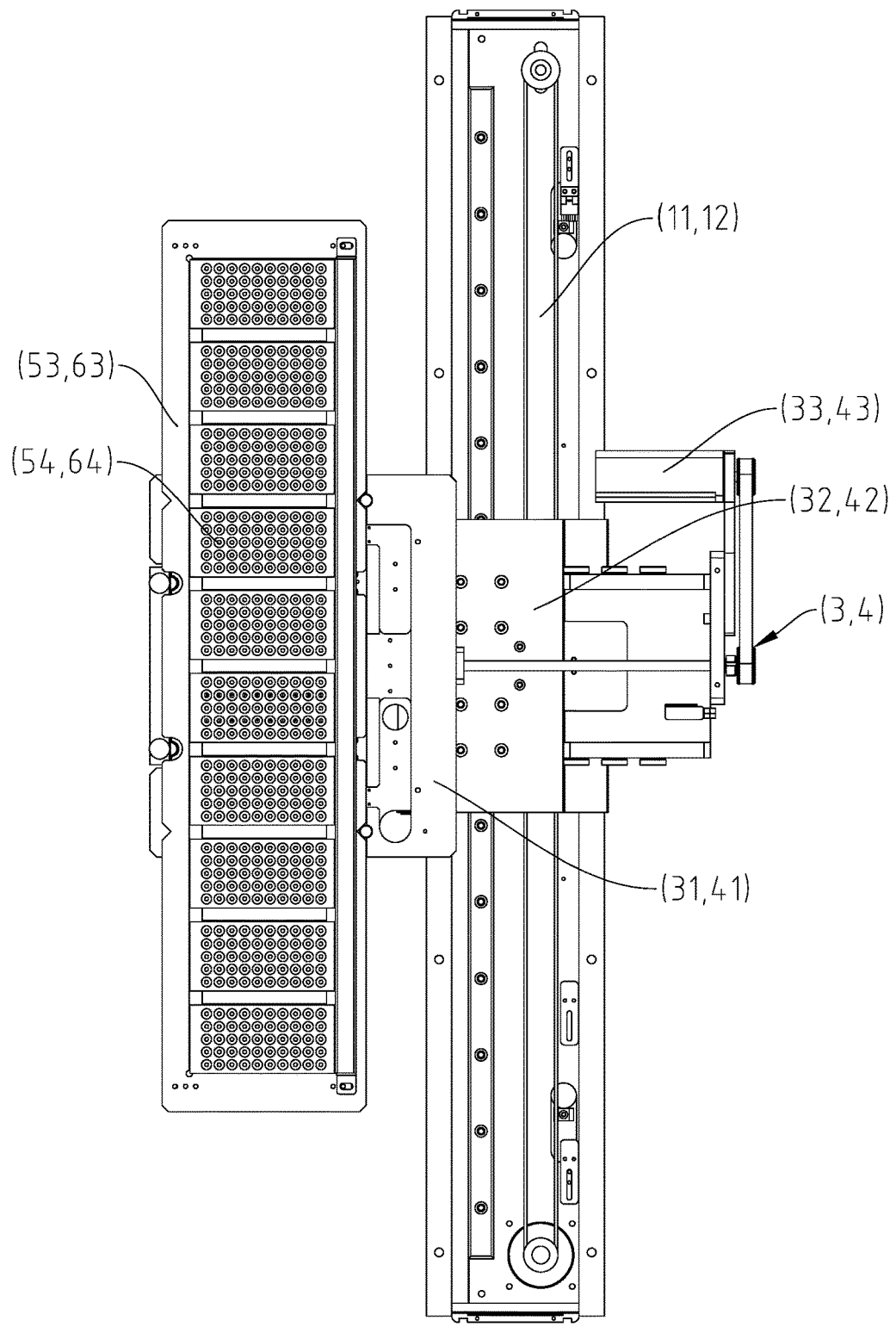
FIG. 12 is a top view illustrating the first pick and place device picked up one feed tray and the second pick and place device picked up one storage tray.
Figure 13:
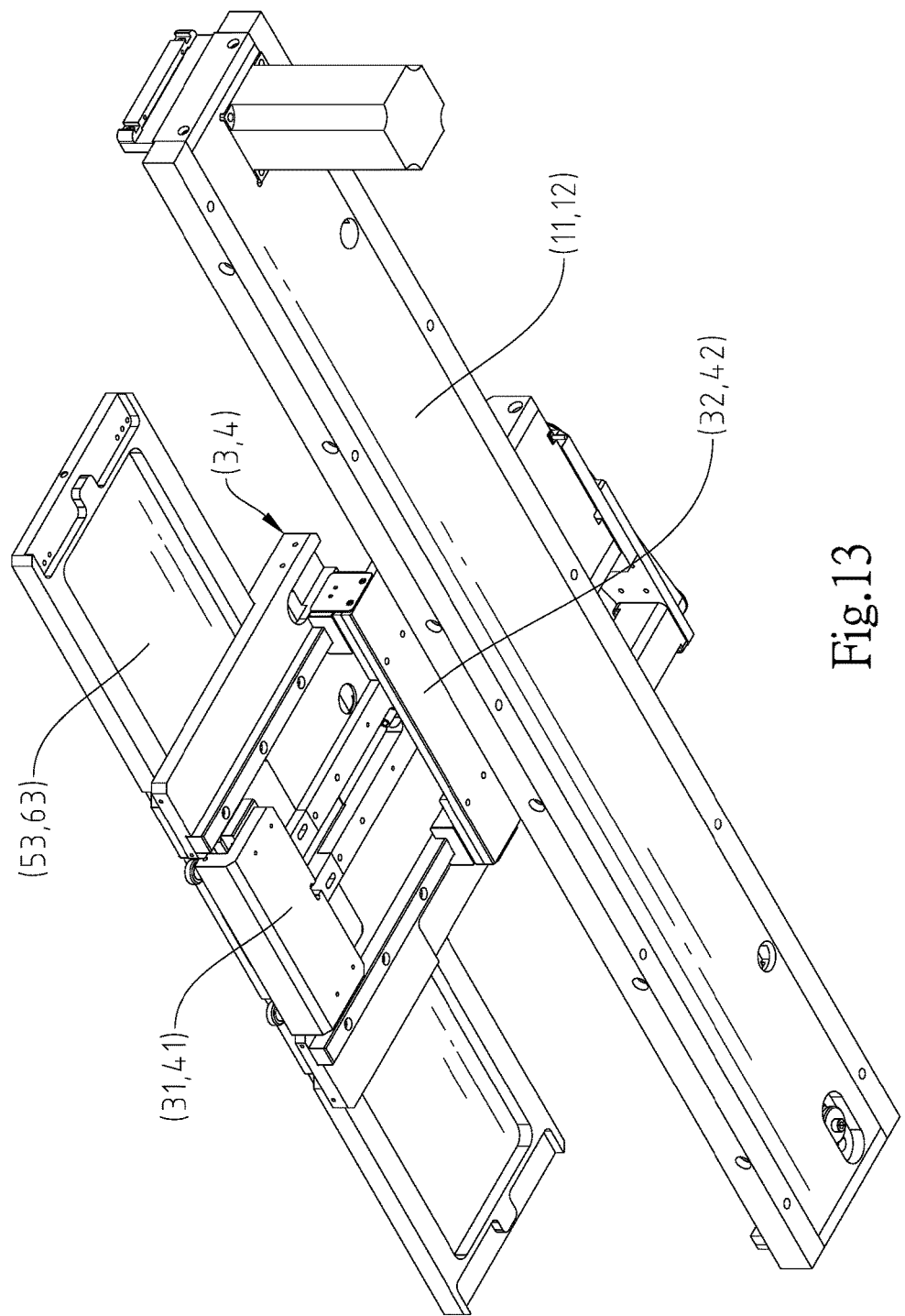
FIG. 13 is an oblique bottom elevational view illustrating the first pick and place device picked up one feed tray and the second pick and place device picked up one storage tray.
Figure 14:
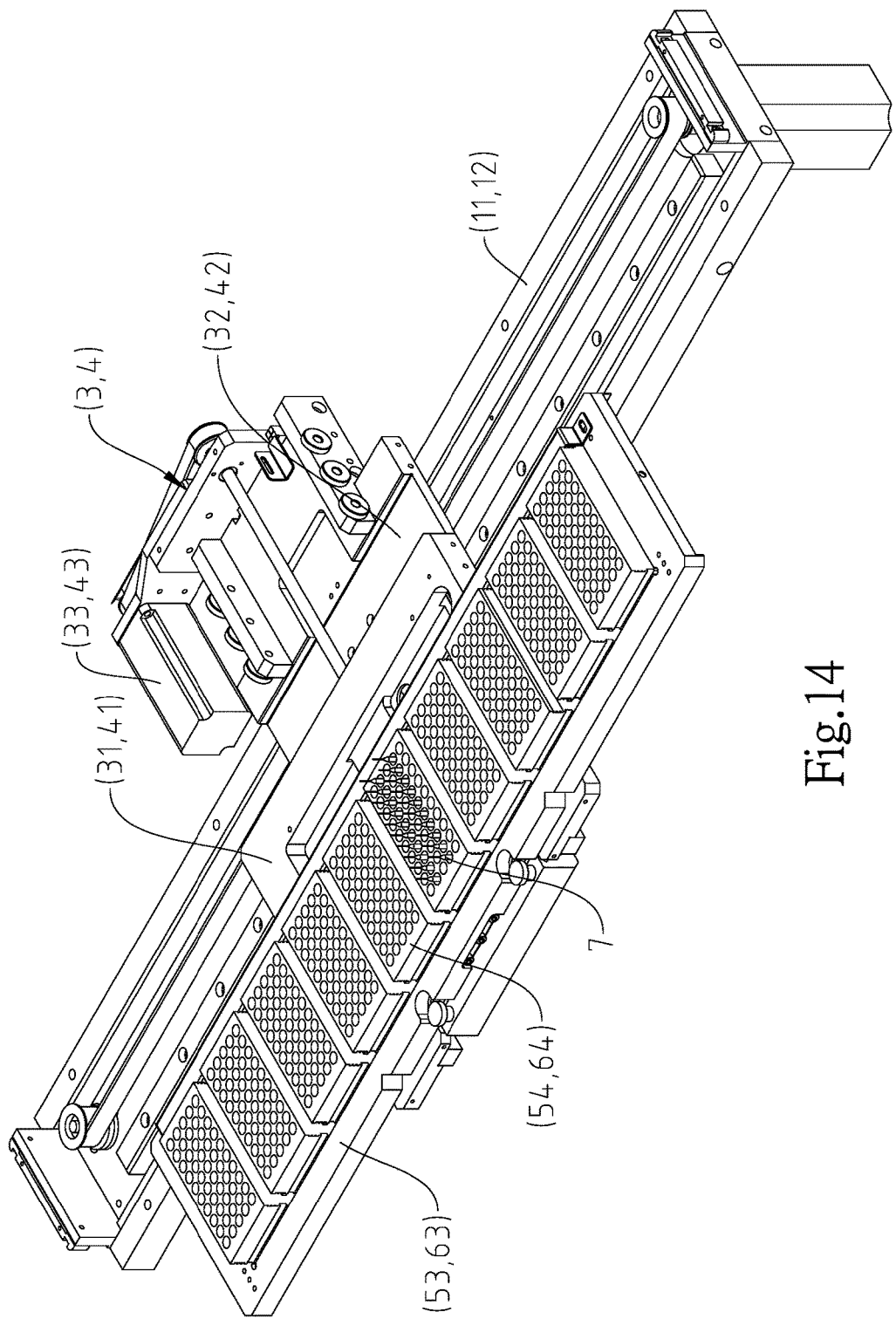
FIG. 14 is an oblique top elevational view illustrating the first pick and place device picked up one feed tray and the second pick and place device picked up one storage tray.

The operation of the present invention will be explained hereinafter with reference to FIGS. 4-14. In operation, as illustrated in FIGS. 4-7, the feed actuator 551 of the feed lifter 55 of the feed unit 5 drives the feed guide rod 553 to rotate, causing vertical movement of the feed three-dimensional rack 52 along the feed sliding rail 511 of the feed shell body 51 to protrude out of the first through hole 13 of the housing 1. At this time, as illustrated in FIGS. 8-10, the first actuator 33 of the first pick and place device 3 drives the first carrier 31 to move toward the feed three-dimensional rack 52 that protrudes out of the housing 1 and then to position between two feed trays 53. Thereafter, the feed actuator 551 of the feed lifter 55 is activated again to rotate the feed guide rod 553, causing downward movement of the feed three-dimensional rack 52 along the feed sliding rail 511 to carry the feed tray 53 from the position above the first carrier 31 to the position in engagement with the first carrier 31. Thereafter, as illustrated in FIGS. 11-14, the first actuator 33 of the first pick and place device 3 is activated again to move the first carrier 31 in direction away from the feed three-dimensional rack 52 so that the feed tray 53 in engagement with the first carrier 31 is moved along the feed tray rail 521 and disengaged from the feed three-dimensional rack 52 for allowing removal of the feed tray 53. At this time, the position the feed tray 53 can be adjusted in the X-axis direction relative to the housing 1 by means of the first sliding seat 32 so that the first clamp assembly 22 of the identification mechanism 2 can pick up drill bits 7 from different positions in the feed box 54 and then place each picked up drill bit 7 in the identification device 24 for identification.

After the identification device 24 of the identification mechanism 2 finished the identification operation, as illustrated in FIGS. 4-7, the storage actuator 651 of the storage lifter 65 of the storage unit 6 drives the storage transmission device 652 to rotate the storage guide rod 653 according to the size-identified data value, lifting the storage three-dimensional rack 62 along the storage sliding rail 611 in the Z-axis direction to protrude out of the second through hole 14 of the housing 1 and to position in this protruding position. At this time, as illustrated in FIGS. 8-10, the second actuator 43 of the second pick and place device 4 drives the second carrier 41 to move toward the storage three-dimensional rack 62 that protrudes over the surface of the housing 1 and then to position below the storage tray 63 according to the size-identified data value. Thereafter, the storage actuator 651 of the storage lifter 65 is activated again to rotate the storage guide rod 653, causing downward displacement of the storage three-dimensional rack 62 along the storage sliding rail 611 and enabling the storage tray 63 corresponding to the size-identified data value to be lowered into engagement with the second carrier 41. Thereafter, as illustrated in FIGS. 11-14, the second actuator 43 of the second pick and place device 4 is activated again to move the second carrier 41 away from the storage three-dimensional rack 62 so that the storage tray 63 in engagement with the second carrier 41 can be moved along the storage tray rail 621 to disengage from the storage three-dimensional rack 62 for removal. At this time, the position of the storage tray 63 can be adjusted in the X-axis direction relative to the surface of the housing 1 by means of the second sliding seat 42 so that the second clamp assembly 23 of the identification mechanism 2 can place each size-identified drill bit 7 in the storage box 64 at the storage tray 63 corresponding to the size-identified data value. Thereafter, the second actuator 43 of the second pick and place device 4 is activated again to move the second carrier 41 toward the storage three-dimensional rack 62, and the storage tray 63 that carries size-identified drill bits 7 is put back to the storage tray rail 621 of the storage three-dimensional rack 62 for storage.

In general, the key technology of the present invention capable of solving the problems and drawbacks of the prior art design is that the feed unit 5 and the storage unit 6 at the two opposite lateral sides of the identification mechanism 2 of the auto-sorting storage/retrieval system 10 are respectively movable up and down so that the identification mechanism 2 can recognize and sort drill bits 7 efficiently, improving space utilization. As the auto-sorting storage/retrieval system 10 can run independently without any additional arrangement, it can be freely installed anywhere without particular space limitation.

What the invention claimed is:

1. An auto-sorting storage/retrieval system, comprising:
   a housing;
   identification mechanism mounted on a surface of said housing for recognizing and sorting drill bits;
   a first pick and place device mounted in said housing and disposed at one side relative to said identification mechanism;
   a second pick and place device mounted in said housing and disposed at an opposite side relative to said identification mechanism; and
   a feed and storage equipment mounted in said housing, said feed and storage equipment comprising a feed unit disposed near one side of said first pick and place device and a storage unit disposed near one side of said second pick and place device opposite to said feed unit, said feed unit comprising a feed three-dimensional rack and a feed lifter for moving said feed three-dimensional rack vertically up and down, said feed three-dimensional rack having mounted therein a plurality of feed trays that are arranged in Z-axis direction for carrying drill bits for identification by said identification mechanism, said storage unit comprising a storage three-dimensional rack and a storage lifter for moving said storage three-dimensional rack vertically up and down, said storage three-dimensional rack having mounted therein a plurality of storage trays that are arranged in Z-axis direction for holding drill bits that are size-identified by said identification mechanism; said feed unit further comprising a feed shell body and two feed sliding rails bilaterally mounted in said feed shell body in Z-axis direction, said feed three-dimensional rack being coupled between said two feed sliding rails, said feed lifter comprising a feed actuator, a feed transmission device and a feed guide rod, said feed transmission device having one end thereof connected to said feed actuator and an opposite end thereof connected to one end of said feed guide rod, said feed guide rod having an opposite end thereof disposed remote from said feed transmission device and connected to said feed three-dimensional rack so that when said feed actuator is activated, said feed transmission device drives said feed guide rod to rotate, causing movement of said feed three-dimensional rack in said feed shell body along said feed sliding rails, said storage unit further comprising a storage shell body and two storage sliding rails bilaterally mounted in said storage shell body in Z-axis direction, said storage three-dimensional rack being coupled between said two storage sliding rails, said storage lifter comprising a storage actuator, a storage transmission device and a storage guide rod, said storage transmission device having one end thereof connected to said storage actuator and an opposite end thereof connected to one end of said storage guide rod, said storage guide rod having an opposite end thereof disposed remote from said storage transmission device and connected to said storage three-dimensional rack so that when said storage actuator is activated, said storage transmission device drives said storage guide rod to rotate, causing movement of said storage three-dimensional rack in said storage shell body along said storage sliding rails;

wherein said feed three-dimensional rack is vertically movable up and down for allowing said first pick and place device to pick up and place said feed trays for storing drill bits for identification by said identification mechanism; said storage three-dimensional rack is vertically movable up and down for allowing said second pick and place device to pick up size-identified drill bits for sorting and place sorted drill bits in said storage trays.

2. The auto-sorting storage/retrieval system as claimed in claim 1, wherein said feed unit further comprises a plurality of feed tray rails bilaterally mounted in said feed three-dimensional rack and spaced in Z-axis direction, said feed trays being respectively supported on said feed tray rails.

3. The auto-sorting storage/retrieval system as claimed in claim 1, wherein said storage unit further comprises a plurality of storage tray rails bilaterally mounted in said storage three-dimensional rack and spaced in Z-axis direction, said storage trays being respectively supported on said storage tray rails.

* * * * *